United States Patent [19]

Ohara et al.

[11] Patent Number: 4,937,110
[45] Date of Patent: Jun. 26, 1990

[54] LAMINATED MATERIAL FOR HOT AND COLD CUPS AND ITS MANUFACTURING METHOD

[75] Inventors: Shuzo Ohara; Ryoichi Kitamura; Hiroshi Kawahara; Noriaki Okunaka; Yoshimi Enomoto, all of Osaka, Japan

[73] Assignee: Goyo Paper Working Co. Ltd., Osaka, Japan

[21] Appl. No.: 222,589

[22] Filed: Jul. 21, 1988

[30] Foreign Application Priority Data

Jul. 22, 1987 [JP] Japan .................. 62-184444

[51] Int. Cl.$^5$ .................. B27N 5/02; B29D 22/00
[52] U.S. Cl. .................. 428/34.2; 428/35.8; 428/451; 428/461; 428/507; 215/1 C
[58] Field of Search .................. 428/34.2, 35.8, 461, 428/451, 507; 215/1 C

[56] References Cited

U.S. PATENT DOCUMENTS 3,988,521 10/1976 Fumel et al. .................. 428/34.2
4,273,816  6/1981 Tollete .................. 428/34.2

FOREIGN PATENT DOCUMENTS 59-64734  4/1984 Japan .
59-78231  5/1984 Japan .
59-80213  5/1984 Japan .
59-83037  4/1986 Japan .
63-23310  6/1988 Japan .
59-83480  6/1988 Japan .

*Primary Examiner*—Edith Buffalow
*Attorney, Agent, or Firm*—Armstrong, Nikaido, Marmelstein, Kubovcik & Murray

[57] ABSTRACT

The present invention provides a laminated material for cups good for both hot and cold drinks comprising a base material and a resin layer laminated thereon, wherein the melting point of the aforementioned resin layer is not less than 95° C. when measured by DSC, the difference $\Delta\theta$ between the advancing contact angle ($\theta a$) and the receding contact angle ($\theta r$) for water is not more than 20°, and the resin layer has a heat sealability. According to the present invention, a laminated material for cups good for both hot and cold drinks can be provided, these cups being also excellent in bubble-arresting property and sliding property as well as vending property.

4 Claims, 2 Drawing Sheets

LAMINATED MATERIAL FOR HOT AND COLD CUPS AND ITS MANUFACTURING METHOD

BACKGROUND OF THE INVENTION

1. Field of the Invention

The present invention relates to a laminated material for hot and cold cups and a manufacturing method therefor and, in particular, it relates to a laminated material for cups good for both hot and cold drinks and also having a good vending property, i.e. suited for sale by a vending machine, and a manufacturing method therefor.

2. Description of the Prior Art

Hitherto as cups for cold drinks such as carbonated drinks there have been widely adopted paper cups impregnated with a wax. Such a wax-impregnated paper cup is made by spraying a molded or formed cup with a molten mixture of paraffins (wax) by the use of a spray gun or the like to have it impregnated therewith for a sufficient water resistance and mechanical strength to be imparted to the paper. This wax-impregnated paper cup, however, had a number of problems or shortcomings, namely (1) the mixture of paraffins used for impregnation is approximately 55°~70° C. in melting temperature, hence when it is used for a hot drink, there occurs undesirable melting out of paraffin/s, (2) when a soft-drink vending machine is placed where temperature is quite high, such cups therein tend to cause blocking due to softening of the wax used for impregnation, (3) the so-called vending properties such as stacking property are poor and (4) the manufacturing process is complicated and productivity is low.

Meanwhile, for hot drinks such as coffee paper cups coated with polyethylene have been often used, but they are usually matte-finished for improved stacking property, and when a cold drink such as a carbonated drink is poured into a cup of this kind, there results a phenomenon of sudden bubbling for the bubbles and the content to overflow, this type of cup being thus not suited for carbonated drinks or the like.

Such being the case, it has been necessary to provide two kinds of cups for hot and cold drinks respectively, this being markedly disadvantageous not only with respect to manufacturing facilities as well as process but also due to the required bulkiness of the vending machine, which means a substantial increase of its cost. The space required for installation of the machine is naturally increased, this resulting in a poor utilization efficiency of a given site and, worse, it is very troublesome to provide and take care of two kinds of cups.

SUMMARY OF THE INVENTION

It is an object of the present invention to provide a laminated material for cups suited for both hot and cold drinks.

Another object of the present invention is to provide a laminated material for cups having good vending properties even if it is so-called mirror-finished, markedly improved in non-bubbling property and also good in sliding property.

Further objects and advantages of the present invention will become apparent to those skilled in the art from the detailed description below.

After intensive studies to attain the aforementioned objects, the present inventors discovered that the advancing contact angle ($\theta a$) and the receding contact angle ($\theta r$) of the resin layer which comes into contact with a drink or the like seriously influence the bubbling phenomenon and the problems of the aforementioned prior art can be solved all at once when the difference $\Delta\theta$ between the aforementioned ($\theta a$) and ($\theta r$) is controlled to below a specific value and its melting point is made not less than a specific temperature, and could thus complete the invention.

DETAILED DESCRIPTION OF THE INVENTION

A first object of the present invention is to provide a laminated material for hot and cold cups comprised of a base material and a resin layer laminated thereon and characterized in that the aforementioned resin layer is not less than 95° C. in melting point measured by DSC and the difference $\Delta\theta$ between the advancing contact angle ($\theta a$) and the receding contacting angle ($\theta r$) for water is not more than 20° and that the resin layer has a heat sealability.

A second object of the present invention is to provide a method for manufacturing a laminated material for hot and cold cups consisting in that a resin compound consisting of a mixture of polyolefin resin and a hydrophobic substance (hereinafter called surface condition adjusting substance) is laminated on a base material and the resin layer thus obtained features having the difference $\Delta\theta$ between the advancing contact angle ($\theta a$) and the receding contact angle ($\theta r$) for water is not more than 20° and having a heat sealability.

Figure 1A:
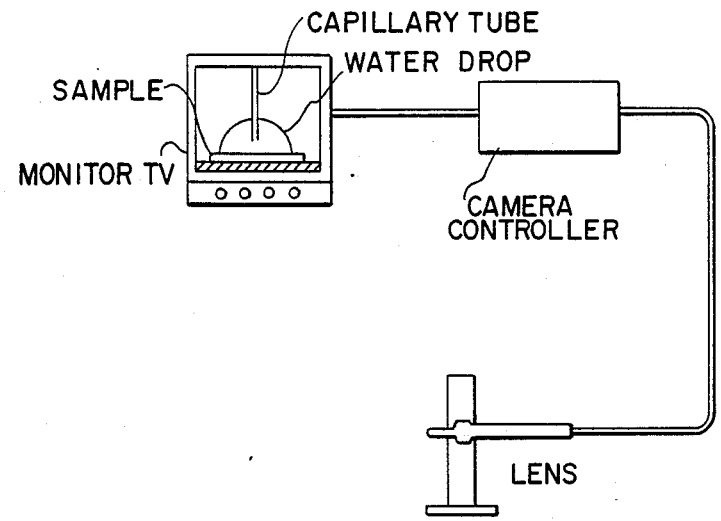
FIG. 1 is a schematic view of a contact angle measuring device used in connection with the present invention (quoted from magazine "Kobunshi High Polymers, Japan", Vol. 33, p. 639, August issue, (1984) and FIG. 2 is another schematic view showing the way of doing a bubbling test.
Figure 1B:
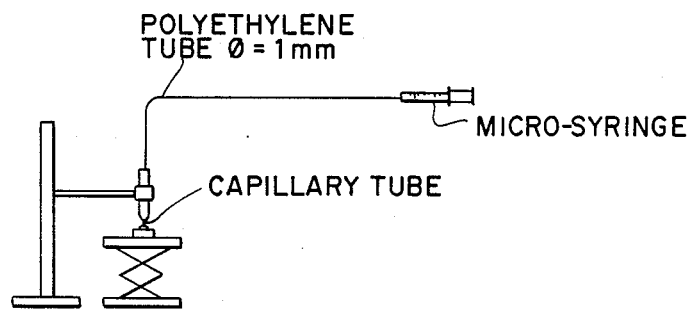

By the way, DSC referred to above is a differential scanning calorimeter and the advancing contact angle ($\theta a$) and the receding contact angle ($\theta r$) are as described in the magazine "Kobunshi High Polymers, Japan", Vol. 33, p. 639, August issue (1984), and the schematic view of the contact angle measuring device shown therein is quoted in FIG. 1.

Referring to the figure, the diameter $\theta$ of the water drop formed is measured by the use of a monitor TV, the height "h" at which the diameter is changed due to increase or decrease of the amount of water drops and the values $\theta a$ and $\theta r$ are calculated by the fomula (I) or (II);

$$\theta(\theta_a \text{ or } \theta_r) \leq \frac{\pi}{2} \quad (I)$$

$$\theta(\theta_a \text{ or } \theta_r) = 2 \tan^{-1}\left(\frac{2h}{\phi}\right)$$

$$\theta(\theta_a \text{ or } \theta_r) > \frac{\pi}{2} \quad (II)$$

$$\theta(\theta_a \text{ or } \theta_r) = 90 + \cos^{-1}\left[\frac{\phi \cdot h}{h^2 + \left(\frac{\phi}{2}\right)^2}\right]$$

In the process of making intensive research about the aforementioned bubbling phenomenon, the present inventors discovered that for the phenomenon, which also depends on the temperature of the liquid to be filled in a cup such as a carbonated drink, the form of the cup et cetera, essentially the most important factor is the contact angle between the cup and the liquid at the cup-liquid contact level and, after further studies, could find out that the bubbling phenomenon is preventable by controlling the difference $\Delta\theta$ between the advancing contact angle ($\theta a$) and the receding contact angle ($\theta r$) measured at a temperature of 25° C.±2° C. and 65% RH at not more than 20°.

As the base material referred to in this invention may be used paper, synthetic resin sheet (or film), metal foil and laminates thereof.

As the surface condition adjusting substance referred to in this invention may be used a hydrophobic substance, which, when it is mixed with polyolefin resin et cetera before sheeting (or filming) of the latter, can control the aforementioned $\Delta\theta$ at not more than 20°, and as such substance may be included a comb-type graft copolymer formed by adding a hydrocarbon having at least one terminal double bond to polymethyl hydrogen siloxane, polymethyl hydro-dimethyl siloxane copolymer or a mixture of the foregoings; a reaction product resulting from reaction among polymethyl hydrogen siloxane, vinyl group-containing polydimethyl siloxane and at least one selected from olefins or polyolefins having at least one double bond; a low molecular wax comprising 4-methylpentene-1 resin or polypropylene resin. Such a comb-type graft-copolymer is described in Patent Application No. 147734/'86, but as hydrocarbon compounds having at least one double-bond reactive with hydrogen of an organic silicone compound are included α-olefin, polyolefin wax, 1,4-polybutadiene, 1,2-polybutadiene, 1-octadecen et cetera and mixture thereof, and as an example of manufacturing method is quoted one consisting in mixing polymethyl hydrogen siloxane (including polymethyl hydrodimethyl siloxane copolymer) with α-olefin having one terminal vinyl group and causing it to undergo an addition reaction under heating after addition of chloroplatinic acid as catalyst. The resulting reactive product is refined by washing with acetone et cetera several times and dried thereafter.

With another reaction product of polymethyl hydrogen siloxane, vinyl group-containing polydimethyl siloxane and at least one selected from olefins or polyolefins having at least one double bond, the silicone ratio is high and the required amount of addition is small but curing is required as means of aftertreatment. As to this reaction product, its manufacturing method is described in Laid-open Application No. 16839/'86.

By the way, silicone oils generally used as defoaming agents for cups for foods are recognized to have a positive defoaming or bubble-arresting effect but they have a risk of being bled out into the drink contained therein and, worse, they are subject to marked change with time, this interfering with quality assurance.

As to polyolefin resins used in the present invention, there is no particular limitation if their melting points measured by DSC are not less than 95° C. and they have a heat- or ultrasonic wave-induced sealability, and included for example are polyethylene, polypropylene, ethylene-α -olefin copolymer resin et cetra.

Although in the present invention the proportion of polyolefin resin to the aforementioned surface condition adjusting substance cannot be generally determined when it is an organic silicone compound as it depends on the silicone content thereof, generally approx. 0.5~6 weight % on polyolefin resin used is considered sufficient, and the amount of its addition is, for example, 2~4 weight % when the silicone content is 40%. If the amount added of the surface condition adjusting substance is in excess of 6 weight %, it results in lowering of the heat-sealability required for successful forming of cups, whereas if it is less than 0.5 weight %, the difference in contact angle $\Delta\theta$ is bound to be more than 20°.

In case the surface condition adjusting substance is a low-molecular wax, its amount of addition may be in a range of approximately 1~15 weight % on polyolefin resin used. If the amount of addition of the low-molecular wax is in excess of 15 weight %, it causes lowering of the resin's workability, whereas if it is less than 1 weight %, the difference in contact angle $\Delta\theta$ is bound to be more than 20°. The prepared compound may preferably be pelletized by the use of a pelletizer.

For the manufacture of the laminated material of the present invention any of all known laminating methods such as extrusion lamination, dry laminating, wet laminating, bonding of films et cetera are usable but the first-mentioned extrusion lamination is particularly preferred for its high production efficiency.

In manufacturing the laminated material of the present invention, it is preferred to lamination-bond the mixture of polyolefin resin and the surface condition adjusting substance to the base material with a layer of polyolefin resin in-between (adhesion enhancing layer). As such polyolefin resin for insertion, polyolefin resin of the same kind as aforementioned may be used. The two-layer lamination may as well be done by the so-called tandem system, but it is commercially advisable to do it simultaneously by the use of a two-layer co-extrusion die.

In the method of the present invention, heat-treatment may as well be given to cause the aforementioned surface condition adjusting substance to migrate toward the surface of the resin layer consisting of olefin resin and the surface condition adjusting substance on the base material so as to be localized in the surface. This heat treatment has an advantage of reducing the amount to be added of the surface condition adjusting substance. The heat treating condition is approx. 1~60 minutes at 70°~120° C., preferably 5~30 minutes. Heat treatment may as well be given for curring of the surface condition adjusting substance.

Examples and control examples of the present invention are given below but, needless to say, the invention is by no means limited thereby. Unless specifically mentioned, part and % given below mean weight part and weight % respectively.

Figure 2A:
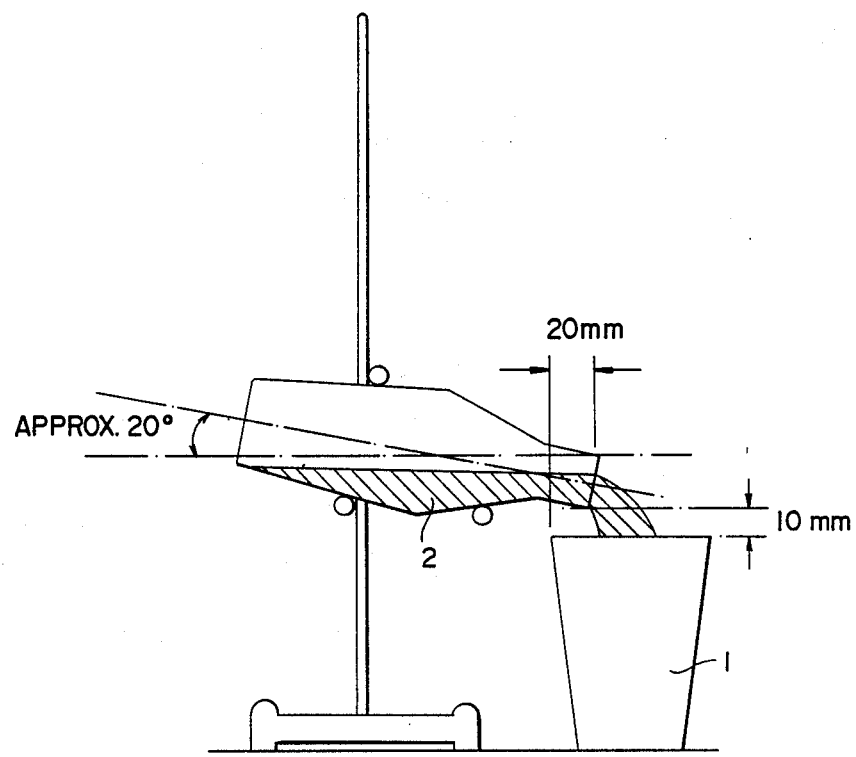
Figure 2B:
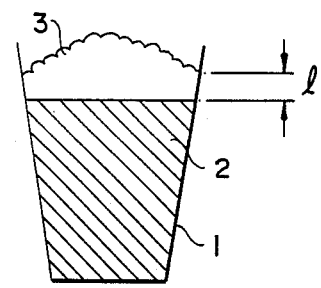

The bubbling test was, as shown in FIG. 2, was carried out by pouring a carbonated drink "Coca Cola ®" (2) controlled to 5° C. in liquid temperature into a 9-ounce cup (1) at a rate of 190 ml/6 seconds, the distance between the highest position where the bubbles (3) are in contact with the inner wall of the cup and the liquid level (L) was measured as well as the time elapsed before the foam vanished from the liquid level.

REFERENCE EXAMPLE 1

Manufacture of surface condition adjusting substance 37.8 parts of polymethyl hydrogen siloxane ($\bar{P}$=300, MW=22000), 62.2 parts of α-olefin ("Dialene-30", trademark, Mitubishi Kasei Corporation, MW=650) and 2 parts of 0.1% tetrahydrofuran solution of $H_2PtCl_6 \cdot 6H_2O$ were charged into a reactor, addition reaction was caused to proceed for 8 hours at 80° C. and the reaction was further allowed to continue for 18 hours at 130° C. The reaction was terminated when the viscosity of the reaction product reached approximately 10,000 cps. The reaction product was washed with acetone 5 times for removal of the unreacted portion and refined and dried. The silicone content of the reaction product obtained was 37.8%.

REFERENCE EXAMPLE 2

Manufacture of surface condition adjusting substance 6.8 parts of polymethyl hydrogen siloxane ($\bar{P}=5\sim7$), 90.2 parts of vinyl group-containing polydimethyl siloxane ($\bar{P}=150$, vinyl group content 0.7%) and 3 parts of 1,2-polybutadiene ("B-1000" of Nippon Soda Co., Ltd., MW=1050) were charged into a reactor, heating was started and 0.3 parts of tertiary butyl peroxide was added as catalyst when the temperature reached 120° C. and under further heating the reaction was continued for 10 hours at 120° C., and the reactor was cooled to stop reaction simultaneously with the start of gelation. The reaction product was refined through elimination of unreacted volatiles by treatment for 12 hours at 110° C. under a partial vacuum of 10 mmHg. The silicone content of the resulting refined product was 97.0%.

EXAMPLE 1

The surface condition adjusting substance obtained in Reference example 1 was added in an amount of 3% to low-density polyethylene ("M-16Sp" of Mitui Petrochemical Co., Ltd., MI: 4. 5 g/minute, density 0.923 g/cm$^3$) and a compound in pellet form as material for cup's surface layer on the liquid-contact side was prepared by the use of a pelletizer at a die temperature of 190 C.

Meanwhile, a separate batch of the same low-density polyethylene as described above was prepared as material for an adhesion enhancing layer. As base material was used a grade of cup paper (of The Japan Paper Industry Co., Ltd., basis weight 220 g/m$^2$).

The polyethylene for the adhesion enhancing layer was first extruded at a die temperature of 330° C. by the use of a common co-extrusion laminator with a mirror roller for cooling, the compound in pellet form for the liquid-contact layer was simultaneously extruded at a die temperature of 300° C., and thus a three-layer laminate of base material/adhesion enhancing layer/liquid-contact layer was prepared. The liquid contact layer was mirror-finished.

The thickness of the adhesion enhancing layer was 15 μm and that of the liquid-contact layer was 15 μm, too. The melting point measured by DSC of the liquid-contact resin layer was 111.5° C.

9-ounce cups were made by the use of a cup-former with the three-layer laminate thus obtained as material, and with them a bubbling test was carried out.

The result was as shown in Table 1. The height of bubbles was small and time required for bubbles to vanish was short, the effect to prevent bubbling being thus markedly remarkable.

EXAMPLE 2

The surface condition adjusting substance obtained in Reference example 2 was added in an amount of 1.0% to the low-density polyethylene resin used in Example 1 as polyolefin resin, and the compound in pellet form as material for cup's surface layer on the liquid-contact side was prepared by the use of a pelletizer at a die temperature of 190° C. Meanwhile, a separate batch of the same low-density polyethylene as described above was prepared as material for the adhesion enhancing layer. As base material was used a grade of cup paper (of The Japan Paper Industry Co., Ltd., basis weight 220 g/m$^2$). In the same manner as described in Example 1 the polyethylene compound for the adhesionenhancing layer was extruded by the use of a co-extrusion laminator at a die temperature of 330° C. and the compound in pellet form for the liquid-contact layer was simultaneously extruded at a die temperature of 300° C., and thus a three-layer laminate of base material/adhesion enhancing layer/liquid-contact layer was prepared. The liquid-contact layer was mirror-finished. The thickness of the adhesion enhancing layer was 15 μm and that of the liquid-contact layer was 15 μm, too.

Then, the obtained three-layer laminate was heat-treated for 10 minutes at 120° C. with the liquid-contact layer up. After the heat-treatment the liquid-contact layer was coated with chloroplatinic acid (IPA solution) at a rate of $2.0\times10^{-1}$ mg/m$^2$, this followed by curing for another 20 minutes at 120° C., and thus a three-layer laminate as cup material was obtained. The melting point of the liquid-contact resin layer measured by DSC was 111.5° C.

9-ounce cups were made by the use of a cup-former with the three-layer laminate thus obtained, and with them a bubbling test was carried out. The result was as shown in Table 1, the functions attained being the same as in Example 1.

EXAMPLE 3

As polyolefin resin, 95% of the low-density polyethylene resin used in Example 1 and 5% of TPX wax "LET-50 (molecular weight=3,000, ring and ball softening point=198°~203° C., decomposition-type wax)" (manufacturer: Sanyo Chemical Industries, Ltd.) were dry-blended, the resulting blend was molten and mixed by a vent-type extruder (die outlet temperature 220° C.) and a compound in pellet form as materiel for cup's liquid-contact surface layer was prepared by the use of a pelletizer.

After thorough drying at 50° C., the aforementioned compound in pellet form was extruded in sheet form (15 μm thick) by a T-die extruder (40 mm in diameter, T-die temperature 300° C.), the resulting sheet was extrusion-laminated on the polyethylene surface of a polyethylene-laminated paper prepared by coating a grade of paper (cup paper, basis weight 220 g/m$^2$) with the same low-density polyethylene (15 μm) as described above, using a mirror roll for cooling, and thus a three-layer laminate of base material/adhesion enhancing layer/liquid-contact layer was prepared. The melting point of the liquid-contact resin layer measured by DSC was 112.5° C.

9-ounce cups were made with aforementioned laminate as material in the same way as described above in Example 1 and with them a bubbling test was carried out.

The result was as shown in Table 1, the bubble hight being small and the time required for bubbles to vanish being short.

CONTROL EXAMPLE 1

Using the same low-density polyethylene as employed in Example 1 but without addition of any surface condition adjusting substance, a three-layer laminate of base material/adhesion enhancing layer/liquid-contact layer was prepared by the use of a co-extrusion laminator in the same way as described above in Example 1. The liquid-contact layer was mirror-finished. The thickness of the adhesion enhancing layer was 15 μm and that of the liquid-contact layer was 15 μm, too. The melting point of the liquid-contact resin layer measured by DSC was 112° C.

9-ounce cups were made with the three-layer laminate thus obtained as material in the same way as described in any of the Examples above, and with them a bubbling test was carried out.

The result was as shown in Table 1, the height of bubbles being large and the time required for bubbles to vanish being long.

CONTROL EXAMPLE 2

Each of the constituent elements of the material of the surface condition adjusting substance (Reference example 1) used in Example 1, namely polymethyl hydrogen siloxane and α olefin, was added separately to the resin compound for the liquid-contact layer at the same ratio given in Example 1 and each three-layer laminate of base material/adhesion enhancing layer/liquid-contact layer was prepared by the use of a co-extrusion laminator. The liquid-contact layer was mirror-finished. The thickness of the adhesion enhancing layer was 15 μm and that of the liquid-contact layer was 15 μm, too. The melting point of the liquid-contact layer measured by DSC was 112° C.

In the bubbling test a slight bubble-arresting effect was noticeable, but quality assurance was difficult due to bleeding out of polymethyl hydrogen siloxane.

TABLE 1

|  | Contact angle* | | | Bubbling test | |
|---|---|---|---|---|---|
|  | θa | θr | Δθ | Bubbles vanished in (sec.) | Height of bubbles (mm) |
| Example 1 | 101.7 | 89.8 | 11.9 | 39 | 6 |
| Example 2 | 103.3 | 88.2 | 15.1 | 40 | 8 |
| Example 3 | 105.0 | 91.1 | 13.9 | 41 | 6 |
| Cont. example 1 | 103.3 | 80.9 | 22.4 | 71 | 20 |
| Cont. example 2 | 104.9 | 83.3 | 21.6 | 53 | 17 |

*1: Contact angle was measured in an atmosphere of 25 ± 2° C. and 65% RH.
2: "Coca Cola ®" Pouring test In an atmosphere of 26° C., room temperature, and 65% RH
3: "Coca Cola ®" liquid temperature 5° C.

As described above, the present invention provides a laminateed material for cups good for both hot and cold drinks. Cups formed of the material of the present invention are good in sliding property, being excellent in vending property even when they are mirror-dinished. Since such cups are good for both hot and cold drinks, manufacture as well as maintenance thereof is easy, vending machines therefor can be made more compact with resulting decrease of the space required for installation thereof and, moreover, such cups are safe from blocking even when they are exposed a high temperatures depending on the location of the vending machine, this facilitating maintenance of cups to be supplied to and kept therein.

What is claimed is:

1. A laminated material for cups good for both hot and cold drinks comprising a base material and a resin layer laminated thereon, wherein the melting point of said resin layer measured by DSC is not less than 95° C., the difference Δθ between the advancing contact angle (θa) and the receding contact angle (θr) for water is not more than 20°, and said resin layer has a heat sealability.

2. A laminated material in accordance with claim 1, wherein said resin layer is composed of polyolefin resin and a hydrophobic substance, hereinafter called surface condition adjusting substance, which imparts thereto a surface condition of not more than 20° in Δθ.

3. A laminated material in accordance with claim 2, wherein said surface condition adjusting substance is a comb graft copolymer made by adding a hydrocarbon having at least one terminal double bond to polymethyl hydrogen siloxane, polymethyl hydrodimethyl siloxane copolymer or a mixture thereof.

4. A method of manufacturing a laminated material for cups good for both hot and cold drinks, wherein a resin being a mixture of polyolefin resin with a surface condition adjusting substance is laminated on a base material and the resin layer of the resulting laminate has a melting point of not less than 95° C. when measured by DSC, the difference Δθ between the advancing contact angle (θa) and the receding contact angle (θr) for water is not more than 20°, and said resin layer has a heat sealability.

* * * * *